(12) United States Patent
Asada et al.

(10) Patent No.: US 10,286,558 B1
(45) Date of Patent: May 14, 2019

(54) AUTONOMOUS ROBOTIC VEHICLES FOR MOBILE STORAGE AND TRASH COLLECTION APPLICATIONS

(71) Applicant: Boston Incubator Center, LLC, Lexington, MA (US)

(72) Inventors: Haruhiko Harry Asada, Lincoln, MA (US); Kumiko Asada, Lincoln, MA (US)

(73) Assignee: Boston Incubator Center, LLC, Lexington, MA (US)

( * ) Notice: Subject to any disclaimer, the term of this patent is extended or adjusted under 35 U.S.C. 154(b) by 149 days.

(21) Appl. No.: 15/491,886

(22) Filed: Apr. 19, 2017

Related U.S. Application Data

(60) Provisional application No. 62/324,770, filed on Apr. 19, 2016.

(51) Int. Cl.
*G01C 21/00* (2006.01)
*B25J 11/00* (2006.01)
*B25J 5/00* (2006.01)

(52) U.S. Cl.
CPC ............. *B25J 11/008* (2013.01); *B25J 5/007* (2013.01); *Y10S 901/01* (2013.01)

(58) Field of Classification Search
CPC ......... B25J 11/008; B25J 5/007; Y10S 901/01
See application file for complete search history.

(56) References Cited

U.S. PATENT DOCUMENTS

| 2003/0112717 A1* | 6/2003 | Plutt | G11B 15/6835 |
| | | | 360/92.1 |
| 2005/0131645 A1* | 6/2005 | Panopoulos | B60P 1/5457 |
| | | | 701/472 |
| 2008/0203302 A1* | 8/2008 | Gunji | H01J 37/20 |
| | | | 250/311 |

* cited by examiner

*Primary Examiner* — Ian Jen
(74) *Attorney, Agent, or Firm* — Spano Law Group; Joseph S. Spano (57) ABSTRACT

Methods and systems for autonomously interacting with persons in a public environment to store and transport their personal material items are described herein. A service robot includes one or more secure storage cells, and is configured to collect items such as personal belongings, refuse, etc., from users and transport the collected items to different locations. The service robot maneuvers through a crowded environment autonomously, avoiding collisions with people and objects, and minimizing disturbances to traffic flow. Users indicate a desire to store and transport items to a desired location. In response, the service robot unlocks a lid of a storage cell, and the user is able to load material items. In some examples, access to the storage cell is controlled based on access codes. In some examples, access to the storage cell is controlled based on receipt of an electronic payment.

20 Claims, 11 Drawing Sheets

AUTONOMOUS ROBOTIC VEHICLES FOR MOBILE STORAGE AND TRASH COLLECTION APPLICATIONS

CROSS REFERENCE TO RELATED APPLICATIONS

The present application for patent claims priority under 35 U.S.C. § 119 from U.S. provisional patent application Ser. No. 62/324,770, entitled "Autonomous Robotic Vehicles For Personal Mobile Locker And Trash Collection Applications," filed Apr. 19, 2016, the subject matter of which is incorporated herein by reference in its entirety.

TECHNICAL FIELD

The described embodiments relate to systems and methods for payload transport in a service environment.

BACKGROUND INFORMATION

Visitors in public locations such as parks, transportation stations, shopping centers, etc. are often burdened with material goods, e.g., luggage, retail items, trash, etc. Storage lockers are commonplace in many public places such as train stations and bus terminals. Although they offer a convenient way to temporarily store personal belongings, lockers are fixed in location and typically they are configured on a pay per use basis. Thus, each time the locker is accessed, full payment must be submitted. This limits their effectiveness as storage facilities where frequent access is required, i.e., shopping trip, etc. Although a hand cart, or other device may be employed as an alternative to storage, many of these devices are clumsy at best and do not effectively relieve the burden of transporting the material items.

Wheeled, robotic vehicles operating in a service environment such as a hospital, public transportation station, etc., are often assigned to perform predetermined transportation tasks (e.g., moving material from one location to another over a pre-defined route). However, many existing wheeled, robotic vehicles are not designed to operate in crowded, unstructured environments, nor do they freely interface with persons sharing space in these environments.

Wheeled, robotic vehicles operating in a service environment such as a hospital, public transportation station, etc., are often required to operate quickly in confined, dynamically changing spaces. In addition, these robotic vehicles must maneuver while carrying heavy payloads to reduce the burden of the people they are serving. In many applications, the mass distribution of the payload varies significantly as the payload changes. Carrying heavy payloads having different mass distributions with high acceleration to operate quickly in confined, dynamically changing spaces presents challenges. The combination of heavy payloads and high acceleration can lead to the generation of excessively high driving forces and the potential for vehicle instability or loss of traction. This can create a hazardous situation in a service environment as the mobile vehicle is often operating in close proximity to humans.

In summary, improvements to the design and control of wheeled, robotic vehicles are desired to perform material storage and transportation tasks in a crowded service environment.

SUMMARY

Methods and systems for autonomously interacting with persons in a public environment such as a train station, airport, etc., and to store and transport their personal material items are described herein.

A service robot includes one or more secure storage cells and is configured to collect material items such as personal belongings, refuse, etc., from persons in a crowded, public environment and transport the collected items to different locations. The service robot maneuvers through a crowded environment autonomously, avoiding collisions with people and objects, and minimizing disturbances to traffic flow.

In one aspect, an autonomous service robot includes one or more independently accessible storage cells. Each storage cell includes a moveable lid and a lid lock device that selectively locks the lid into a closed position, thus securing its contents.

In one example, a service robot navigates through a crowded environment e.g., at a public transportation station, and solicits material storage and transportation services audibly, visually, or both. A user verbally responds to the solicitation by speaking back to service robot indicating a desire to engage the material storage and transportation services of the service robot. In response the service robot unlocks a lid of a storage cell. The user is able to load material items such as luggage, retail items, personal items, etc. In some examples, access to the storage cell is controlled based on access codes. In one example, the service robot communicates an access code to a portable electronic device controlled by the user. When the user wants to access items stored in the storage cell, the portable electronic device communicates the access code back to the service robot. In response, the service robot unlocks the storage cell.

In some examples, access to the storage cell is controlled based on receipt of an electronic payment. In one example, an access code is communicated to a portable electronic device in response to receipt of payment.

In some examples, a user verbally communicates a desired location and time to transport the items loaded into a storage cell. In this manner, a user indicates how the user wants the service robot to handle their secured items. In some examples, the user wants the service robot to follow the user. In some examples, the user wants the service robot to meet the user at a specified location by a specified time. In some other examples, the user wants the service robot to transport the secured items to a parcel delivery service terminal for shipment to a desired address.

In another aspect, each storage cell includes a cell lock device that selectively locks each storage cell to the payload platform of the service robot. In this manner, a user may remove the entire storage cell from the service robot, for example, to ship the storage cell and its contents to a desired destination.

In other examples, a service robot operates in a public area and assists the public with refuse disposal. In these examples, a storage pod includes one or more refuse containers. The service robot approaches visitors in a crowded environment (e.g., public park, transportation center, etc.) and collects trash and recyclable items. The service robot senses when the storage cells become full, and navigates to a waste disposal terminal where the collected refuse is unloaded from each of the storage cells.

In a further aspect, service robot 100 includes a payload platform that is movable with respect to the vehicle. The position of the payload platform with respect to the vehicle is controlled to reduce the distance between the center of mass of the service robot and a center of rotation of the vehicle moving along a motion trajectory. In this manner, induced centrifugal forces are reduced, allowing for operation at higher speed while maintaining vehicle stability.

The foregoing is a summary and thus contains, by necessity, simplifications, generalizations, and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Methods and systems for storing and transporting material items autonomously in a public environment such as a train station, airport, etc., are described herein.

A wheeled, robotic vehicle including one or more secure storage cells is configured to collect material items such as personal belongings, refuse, etc., from persons in a crowded, public environment and transport the collected items to different locations. The wheeled, robotic vehicle maneuvers through a crowded environment autonomously, avoiding collisions with people and objects, and minimizing disturbances to traffic flow. In this manner, services such as material storage and trash collection are brought directly to the users. This minimizes the need for users to move to fixed locations for storage and trash service, and thus reduces congestion in crowded public facilities. In some embodiments, an autonomous service robot provides on-demand storage and transportation services in public places such as train stations, bus terminals, and airports. In some other embodiments, an autonomous service robot provides on-demand trash collection services in public places.

Figure 1:
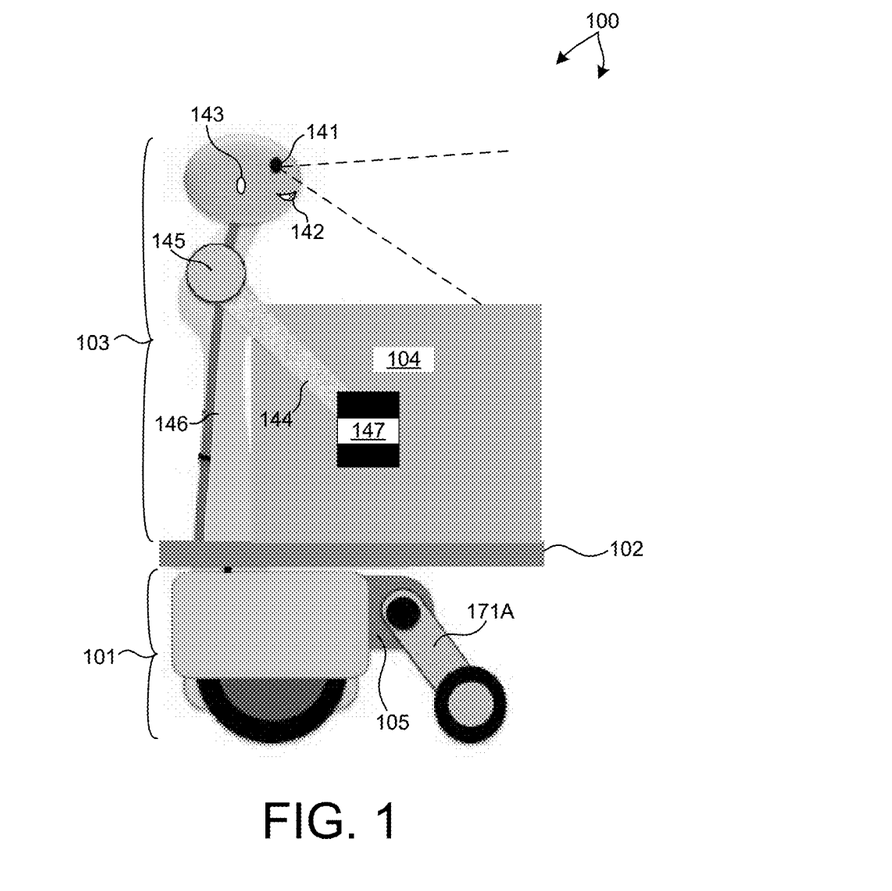
FIG. 1 is a diagram illustrative of an embodiment of a service robot 100 in at least one novel aspect.

FIG. 1 depicts a service robot 100 in one embodiment. Service robot 100 includes a wheeled, robotic vehicle 101 with driving and steering wheels attached to a frame 105 of the vehicle 101. Service robot 100 also includes a payload platform 102 configured to carry a secured storage pod 104. In addition, service robot 100 includes an upper body robot 103 configured to interact with users of service robot 100. Service robot 100 includes an image capture device 141, an audio input device 143, an audio output device 142, an image display device (not shown), and an electronic payment device 147 employed to interact with users of service robot 100. In addition service robot 100 includes a torso structure 146, rotary actuator 145, and arm 144. These elements are designed to give the service robot a human-like interface. In some embodiments, the torso structure 146 is actuated, and together with arm 144, the upper body robot 103 is configured to perform greeting gestures and service gestures in a human-like manner. In one example, service robot 100 holds the electronic payment device 147 at the end of arm 144, and robot 100 extends the electronic payment device 147 toward a human user when payment is required.

Figure 2:
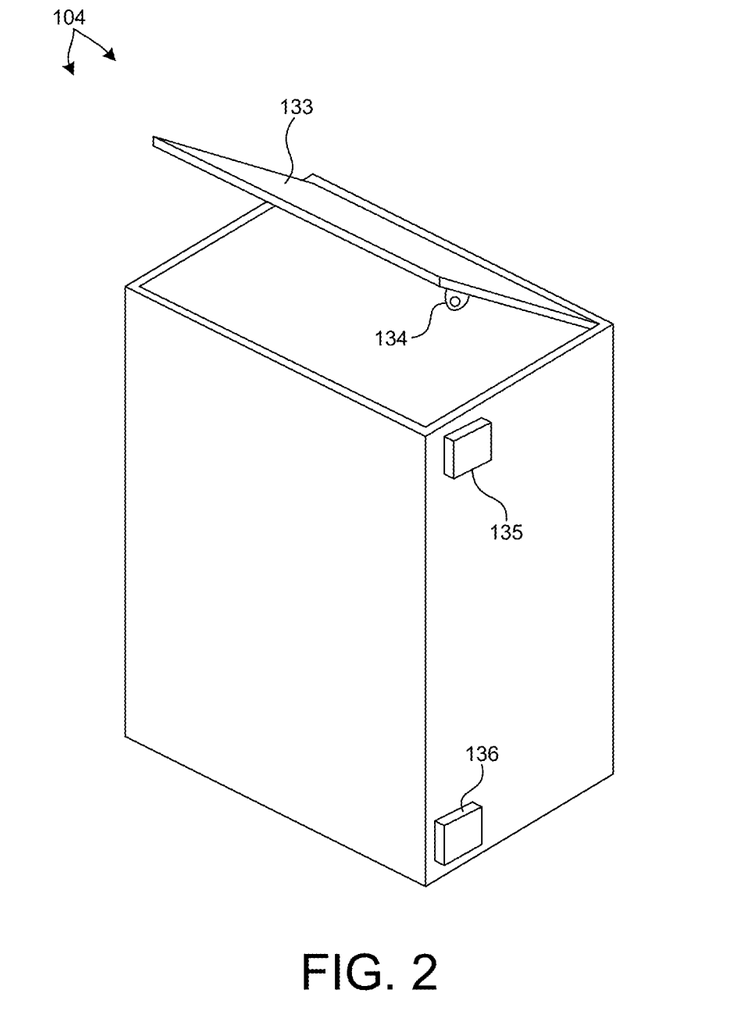
FIG. 2 depicts an illustration of a storage cell 104 including a moveable lid 133 and lid lock device 135.

In one aspect, secured storage pod 104 includes one or more independently accessible storage cells. FIG. 2 depicts an illustration of a storage cell 104 including a moveable lid 133 and a lid lock device 135 that selectively locks lid 133 into a closed position. In a closed position, moveable lid 133 prevents access to the storage volume of the storage cell. In an open position, moveable lid permits access to the volume of the storage cell. In one example, lid 133 includes a lock feature 134 that interacts with lid lock device 135 in a locked state to secure lid 133 in the closed position.

In addition, in the depicted embodiment, storage cell 104 includes a cell lock device 136 that selectively locks storage cell 104 to platform 102 of service robot 100. In some embodiments, storage cell 104 is fixed to platform 102. In some other embodiments, storage cell 104 is removably coupled to platform 102. In one example, storage cell 104 is unlocked from platform 102 by changing a state of cell lock device 136 to an unlocked state. In this manner, a user may remove storage cell 104 from platform 102, for example, to ship storage cell 104 and its contents to a desired destination.

Figure 3:
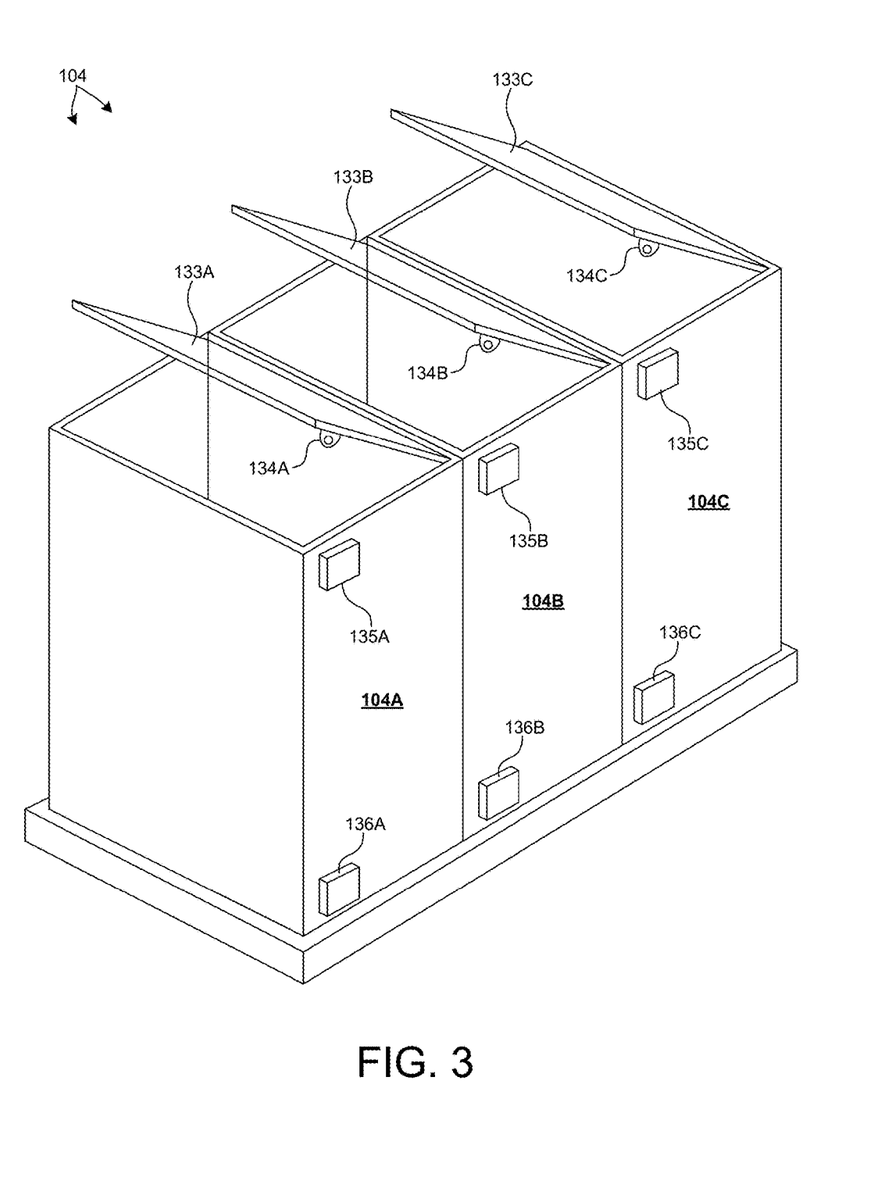
FIG. 3 depicts an illustration of a multi-unit storage cell 104 including a number of storage cells 104A-C.

FIG. 3 depicts an illustration of a multi-unit storage cell 104 including a number of storage cells 104A-C. Each storage cell includes a moveable lid (lids 133A-C), a lid lock device (lid lock devices 135A-C), and a cell lock device (cell lock devices 136A-C). In this manner, each storage cell 104A-C is independently accessible in the manner described with reference to FIG. 2.

Figure 4:
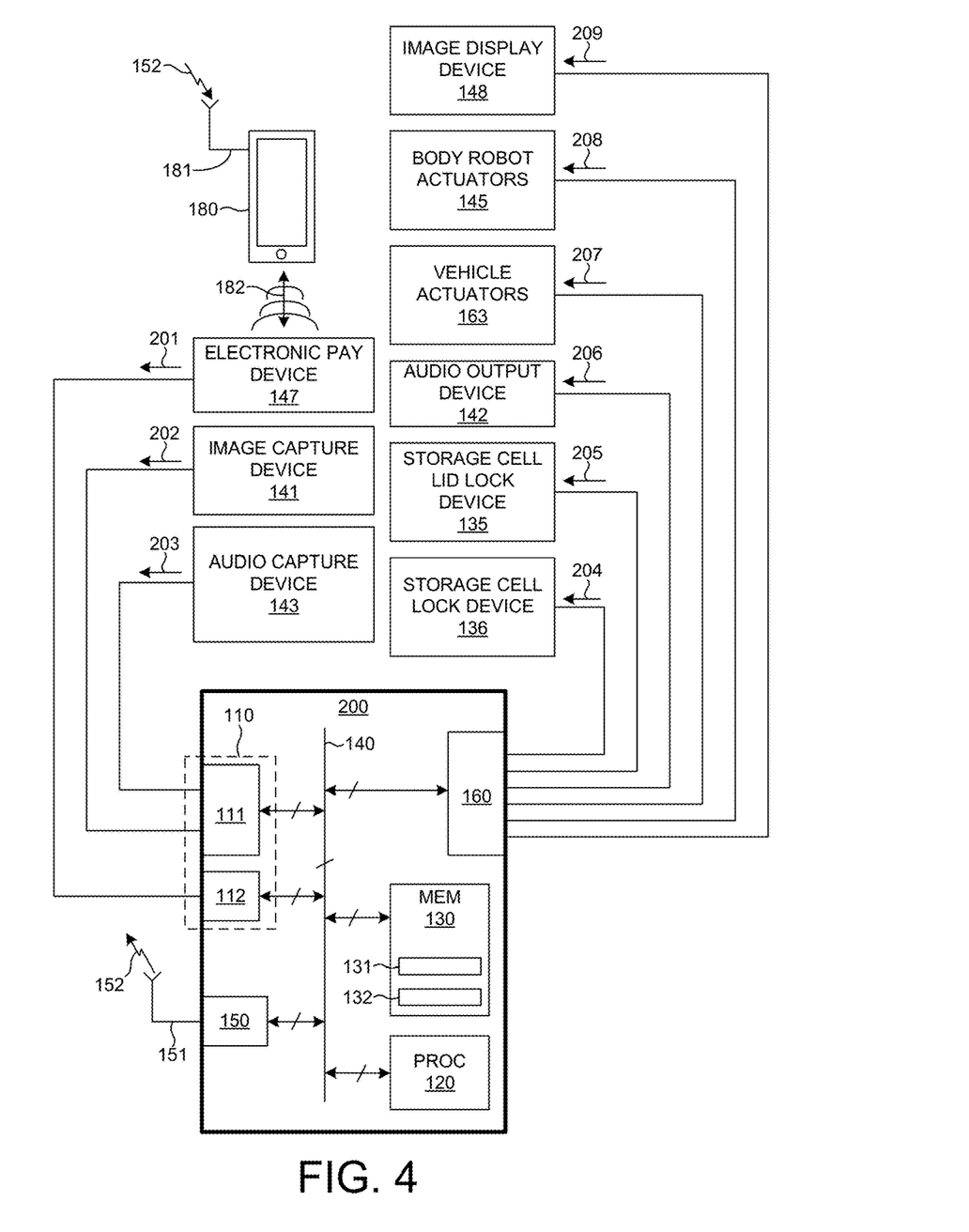
FIG. 4 is a diagram illustrative of elements of a service robot 100.

FIG. 4 is a diagram illustrative of elements of a service robot 100 including computing system 200, electronic payment device 147, image capture device 141, audio capture device 143, image display device 148, body robot actuators 145, vehicle actuators 163, speaker 142, storage cell lid lock device 135, and storage cell lock device 136. In the embodiment depicted in FIG. 4, computing system 200 is communicatively coupled to electronic payment device 147, image capture device 141, audio capture device 143, image display device 148, body robot actuators 145, vehicle actuators 163, speaker 142, storage cell lid lock device 135, and storage cell lock device 136 by wired communications links. However, in general, computing system 200 may be communicatively coupled to any of the sensors and devices described herein by either a wired or wireless communication link.

As depicted in FIG. 4, electronic pay device 147, image capture device 141, storage cell lock device 136 and body robot actuators 145 are communicatively coupled to computing system 200. These particular sensors and devices are presented by way of example, and their inclusion as elements of a service robot system is optional. In general, any number of sensors attached to the service robot 100 to interact with a human user in a natural language, navigate a crowded environment, and store and transport material items may be communicatively coupled to computing system 200.

As depicted in FIG. 4, computing system 200 includes a sensor interface 110, at least one processor 120, a memory 130, a bus 140, a wireless communication transceiver 150, and a controlled device interface 160. Sensor interface 110, processor 120, memory 130, wireless communication transceiver 150, and controlled device interface 160 are configured to communicate over bus 140.

Sensor interface 110 includes analog to digital conversion (ADC) electronics 111. In addition, in some embodiments, sensor interface 110 includes a digital input/output interface 112. In some other embodiments, sensor interface 110 includes a wireless communications transceiver (not shown) configured to communicate with a sensor to receive measurement data from the sensor.

As depicted in FIG. 4, ADC 111 is configured to receive signals 203 from audio capture device 143. In another non-limiting example, ADC 111 is configured to receive signals 202 from image capture device 141. ADC 111 is further configured to convert the analog signals 202 and 203 into equivalent digital signals suitable for digital storage and further digital processing. ADC 111 is selected to ensure that the resulting digital signal is a suitably accurate representation of the incoming analog signals (i.e., quantization and temporal discretization errors are within acceptable error levels). In some other embodiments, image capture device 141 and audio capture device 143 include image and audio capture and processing capability on-board. In these embodiments, image and audio data are communicated digitally to computing system 200.

As depicted in FIG. 4, digital I/O 112 is configured to receive digital signals 201 from electronic pay device 147. In this example, electronic pay device 147 includes on-board electronics to generate digital signals 201 indicative of payment status. In this manner, computing system 200 is configured to interface with both analog and digital sensors. In general, any of the sensors described herein may be digital or analog sensors, and may be communicatively coupled to computing system 200 by the appropriate interface.

Controlled device interface 160 includes appropriate digital to analog conversion (DAC) electronics. In addition, in some embodiments, controlled device interface 160 includes a digital input/output interface. In some other embodiments, controlled device interface 160 includes a wireless communications transceiver configured to communicate with a device, including the transmission of control signals.

As depicted in FIG. 4, controlled device interface 160 is configured to transmit control commands 207 to the vehicle actuators 163 that cause the wheeled, robotic vehicle 101 to move along a desired motion trajectory. In another non-limiting example, controlled device interface 160 is configured to transmit control commands 208 to body robot actuators, such as rotary actuator 145, to move upper body robot 103 as described herein. In yet another non-limiting example, controlled device interface 160 is configured to transmit command signals 206 to audio output device 142, such as a speaker, that causes the speaker to communicate verbally with a human user. In yet another non-limiting example, controlled device interface 160 is configured to transmit display signals 209 to image display device 148 that cause the image display device to visually communicate with a human user. In general, any combination of audio/visual input and output devices may be contemplated to implement a natural language communication interface between service robot 100 and a human user to facilitate material storage and transportation services as described herein.

In yet another non-limiting example, controlled device interface 160 is configured to transmit command signals 205 to a storage cell lid lock device 135 that causes the storage lid lock device to lock or unlock the lid of a storage cell, thus controlling access to the contents stored therein. In yet another non-limiting example, controlled device interface 160 is configured to transmit command signals 204 to storage cell lock device 136 that causes the lock device to lock or unlock a storage cell from platform 102 of service robot 100, thus controlling access to the entire storage cell.

Memory 130 includes an amount of memory 131 that stores measurement data collected from sensors 141, 143 and 147. Memory 130 also includes an amount of memory 132 that stores program code that, when executed by processor 120, causes processor 120 to implement user interaction functionality, storage cell access functionality, payload repositioning functionality, vehicle navigation functionality, and upper body robot movement functionality as described herein.

In some examples, processor 120 is configured to store digital signals generated by sensor interface 110 onto memory 131. In addition, processor 120 is configured to read the digital signals stored on memory 131 and transmit the digital signals to wireless communication transceiver 150. In some embodiments, wireless communications transceiver 150 is configured to communicate the digital signals from computing system 200 to an external computing device over a wireless communications link. As depicted in FIG. 4, wireless communications transceiver transmits a radio frequency signal 152 over antenna 151. The radio frequency signal 152 includes digital information indicative of the digital signals to be communicated from computing system 200 to the external computing device. In one example, access codes generated by computer system 200 are communicated to a portable electronic device 180 for purposes of controlling access to one or more storage cells 104.

In one example, service robot 100 is an autonomous robotic vehicle operating in a public transportation station (e.g., train station). In this example, service robot 100 navigates through the crowded environment of the public transportation station and solicits material storage and transportation services audibly, visually, or both. Computing system 200 communicates control commands 207 to vehicle actuators 163 that cause the autonomous robotic vehicle to navigate through the crowded environment. In addition, computing system 200 communicates audio signals 206 to audio output device 142, display signals to image display device 148, or both, that cause these audio/visual devices to solicit material storage and transportation services to potential users of the service robot. A user verbally responds to the solicitation by speaking back to service robot 100 indicating a desire of the user to engage the material storage and transportation services of the service robot. Computing system 200 receives signals 203 captured by audio capture device 143 indicative of the spoken language input from the user. In some examples, computing system 200 communicates control commands 205 that cause the storage cell lid lock device 135 to unlock a moveable lid of a storage cell. The user is able to load material items such as luggage, retail items, personal items, etc. In one embodiment, storage cell lid lock device 135 includes a solenoid actuator that moves a lock bar from a locked position to an unlocked position to release moveable lid and allow a user to access a storage cell. In general, however, any suitable electronically controlled locking mechanism is contemplated within the scope of this patent document.

In some examples, access to the storage cell is controlled by computing system 200 based on access codes. In one example, computing system 200 wirelessly communicates an access code 152 to a portable electronic device 180 controlled by the user of service robot 100. The portable electronic device 180 may be a smart phone device, portable tablet computing device, or any other portable computing system. The portable electronic device 180 includes an antenna 181 and communication transceiver hardware (not shown) suitable for transmitting and receiving communications wirelessly. The access code 152 is communicated back to computing system 200 anytime a user wants to unlock and access the contents of the storage cell.

In some examples, access to the storage cell is controlled by computing system 200 based on receipt of an electronic payment. As depicted in FIG. 4, electronic payment information 182 is communicated between portable electronic device 180 and electronic pay device 147 of service robot 100. In one example, payment information 182 is communicated in accordance with a near field communication protocol. In one example, access code 152 is communicated to portable electronic device 180 in response to receipt of payment via electronic payment device 147. In general, any suitable device for communication of access codes and payment information between service robot 100 and portable electronic device 180 is contemplated within the scope of this patent document.

In some examples, a user verbally communicates a desired time and location to service robot 100. Computing system 200 receives signals 203 captured by audio capture device 143 indicative of this spoken language input from the user. In this manner, a user indicates how the user wants the service robot 100 to handle their secured items. In response, computing system 200 communicates control commands 207 to actuators 163 of the autonomous robotic vehicle that cause the autonomous robotic vehicle to navigate to the desired location in the desired time frame.

In some examples, the user wants the service robot to follow the user. In these examples, the service robot stays within a predetermined distance of the user, and effectively follows the lead of the user. Along the way, the user may request and be granted access to the storage cell to access stored items or store additional items.

In some examples, the user wants the service robot to meet the user at a specified location by a specified time. In these examples, the service robot navigates to the desired location (e.g., a train platform, a taxi terminal, etc.) within the desired time period. In some of these examples, the service robot provides storage and transportation services to other users in the intervening time.

In some other examples, the user wants the service robot to transport the secured items to a parcel delivery service terminal for shipment to a desired address. At the parcel delivery service terminal, the service robot 100 authenticates the parcel delivery service provider and provides access to the secured items. In some examples, service robot 100 communicates the desired shipping address to the parcel delivery service provider. In some other examples, the desired shipping address is communicated to the parcel delivery service provider by the user directly via portable electronic device 180.

In some embodiments, service robot 100 provides access to the secured items by unlocking the moveable lid of the storage cell containing the secured items. In these embodiments, the parcel delivery service provider unloads the items and prepares them for shipment. In some other embodiments, service robot 100 unlocks the storage cell from platform 102, and the parcel delivery service provider unloads the storage cell together with its secured contents from service robot 100. The storage cell may be subsequently unloaded by the parcel delivery service provider, or shipped in its entirety to the desired shipping address.

Figure 5:
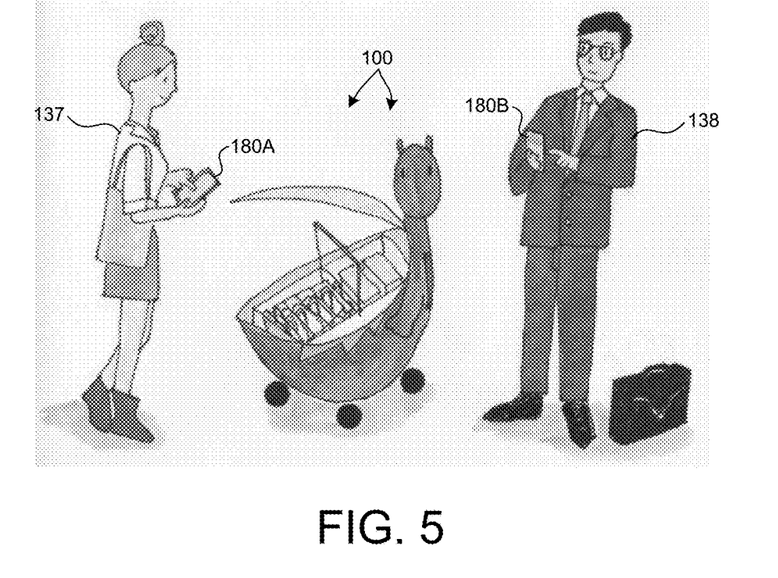
FIG. 5 depicts an illustration of two users 137 and 138, each communicating with a service robot 100 with different portable electronic devices 180A and 180B.

In other examples, service robot 100 operates in a public area and assists the public with refuse disposal. In these examples, storage pod 104 includes one or more refuse containers. Service robot 100 approaches visitors in a crowded environment (e.g., public park, transportation center, etc.) and collects trash and recyclable items. Service robot 100 senses when the storage cells 104 become full based on payload sensor information received from payload sensors on board service robot 100. In response, service robot 100 navigates to a waste disposal terminal where the collected refuse is unloaded from each of the storage cells 104. I As described herein, service robot 100 is configured to provide secure storage and transportation services to multiple users. Each independently accessible storage cell 104A-C may be accessible by a different user. FIG. 5 depicts an illustration of two users 137 and 138, each communicating with service robot 100 with different portable electronic devices 180A and 180B, respectively. In this manner, each user communicates payment information and access codes independently to access different storage cells.

In a further aspect, service robot 100 includes a payload platform that is movable with respect to the vehicle. The position of the payload platform with respect to the vehicle is controlled to reduce the distance between the center of mass of the service robot and a center of rotation of the vehicle moving along a motion trajectory. In this manner, induced centrifugal forces are reduced, allowing for operation at higher speed while maintaining vehicle stability.

Figure 6:
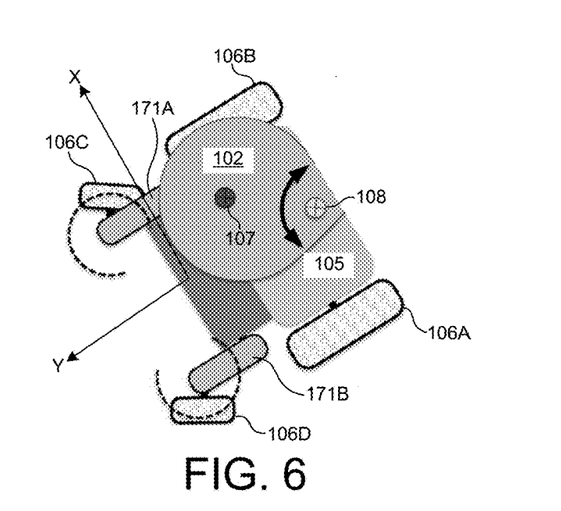
FIG. 6 depicts a top view of a wheeled, robotic vehicle and payload platform of service robot 100.

FIG. 6 depicts a top view of the wheeled, robotic vehicle 101 and payload platform 102 of service robot 100. As depicted in FIG. 6, wheeled, robotic vehicle 101 includes drive wheels 106A and 106B and steering wheels 106C and 106D. In some embodiments, steering wheels 106C and 106D are passive wheels that are free to rotate about multiple axes. In these embodiments, steering wheels 106C and 106D function primarily to support the load normal to the ground surface, while the rotations of drive wheels 106A and 106D dictate the motion trajectory of the wheeled, robotic vehicle 101. In some other embodiments, the orientation of steering wheels 106C and 106D about an axis normal to the ground surface is actively controlled. In these embodiments, steering wheels 106C and 106D also function to control the direction of the motion trajectory of the wheeled, robotic vehicle 101. In some other embodiments, both the rotation of steering wheels 106C and 106D and the orientation of steering wheels 106C and 106D about an axis normal to the ground surface are actively controlled. In these embodiments, steering wheels 106C and 106D function to control both the direction of the motion trajectory and the velocity along the motion trajectory of the wheeled, robotic vehicle 101.

FIG. 6 depicts an XY coordinate frame fixed to the wheeled, robotic vehicle 101. Also, as depicted in FIG. 6, payload platform 102 is movable with respect to a frame 105 to which the wheels of the wheeled, robotic vehicle are attached and is movable in at least the X-direction. In the embodiment depicted in FIG. 6, a rotary actuator 108 is configured to rotate payload platform 102 about an axis of the rotary actuator 108 and move payload platform 102 with respect to frame 105 of the wheeled, robotic vehicle 101 and in the X and Y directions. In some other embodiments, one or more linear actuators are employed to move payload platform 102 with respect to frame 105 of wheeled, robotic vehicle 101. In some of these embodiments, the one or more linear actuators are employed to move payload platform 102 in the X-direction. In some of these embodiments, the one or more linear actuators are employed to move payload platform 102 in the X and Y directions.

In addition, FIG. 6 depicts the location 107 of the center of mass of the payload 104 placed on top of the payload platform 102. In some embodiments, payload platform 102 includes force sensors (not shown in FIG. 2) to measure the mass of payload 104 and to estimate the location of the center of mass of payload 104 with respect to payload platform 102. In some other embodiments, wheeled, robotic vehicle 101 includes force sensors (not shown in FIG. 2) at each wheel. These force sensors are employed to measure the mass of payload 104 and to estimate the location of the center of mass of the moving mass of service robot 100. In general, the center of mass of the service robot without payload is known a priori and depends on the position of payload platform 102 in a known manner. However, the center of mass of the service robot with payload is unknown a priori due to variation in payload mass and location of the payload on the payload platform 102. Thus, the payload sensors are employed to measure the mass of payload 104 and the location of the center of mass of payload 104 directly, or indirectly based on mass distribution measurements that include elements of service robot 100 with known center of mass. In general, any suitable arrangement of sensors may be employed to measure the location of the center of mass of the payload 104.

Figure 7:
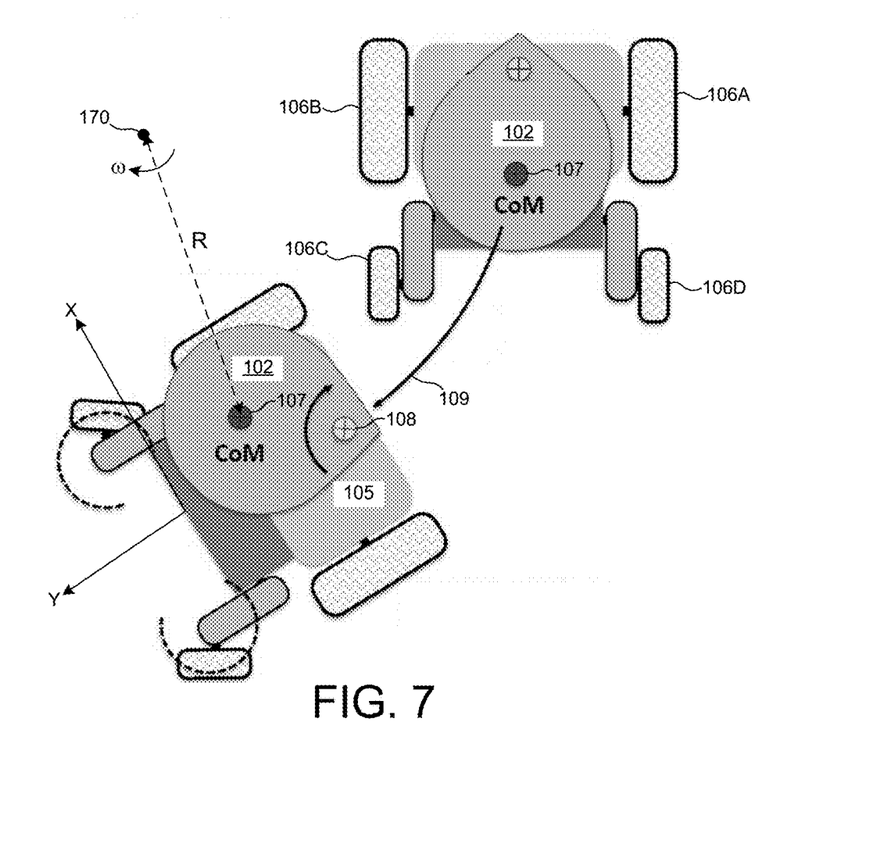
FIG. 7 depicts a wheeled, robotic vehicle of a service robot moving along a curved motion trajectory from a first location to a second location.

As depicted in FIG. 7, wheeled, robotic vehicle 101 moves along a motion trajectory 109 from a first location to a second location. The motion trajectory 109 involves a turn toward the right as viewed from the perspective of the vehicle moving forward. Computing system 200 of service robot 100 controls the vehicle actuators 163 to execute the desired motion trajectory 109. In addition, computing system 200 computes the instantaneous center of rotation of the wheeled, robotic vehicle 101 as the vehicle 101 moves along motion trajectory 109. In the embodiment depicted in FIG. 7, computing system 200 sends command signals to rotary actuator 108 that causes the rotary actuator 108 to rotate payload platform 102 in a direction toward the instantaneous center of rotation 170. In this manner, the distance, R, between the instantaneous center of rotation 170 and the location 107 of the center of mass of the payload 104 is reduced. The movable payload platform 102 is moved such that the center of mass of the wheeled, mobile robotic vehicle, including the payload platform and any payload disposed on the payload platform is moved closer to a center of rotation of the wheeled, mobile robotic vehicle at any point along the motion trajectory of the vehicle. In this manner, the centrifugal forces associated with a turn of the vehicle are reduced. This allows for a more rapid turn of the vehicle for a given set of tractive forces generated by the wheels of the service robot 100.

The centrifugal force induced by the movement of the service robot 100 along the motion trajectory 109 is determined by equation (1), where m is the moving mass, w is the instantaneous angular velocity of the mass about the instantaneous center of rotation, and R is the distance between the center of mass of the moving mass and the instantaneous center of rotation.

$$F_{centrifugal} = m\omega^2 R \tag{1}$$

In some examples, the payload platform 102 is moved such that the center of mass of the service robot 100 is aligned with the center of rotation of the vehicle (e.g., R is approximately zero). In these examples, the induced centrifugal force is approximately zero. This enables rapid turning capability with a minimum of tractive drive force.

Figure 8:
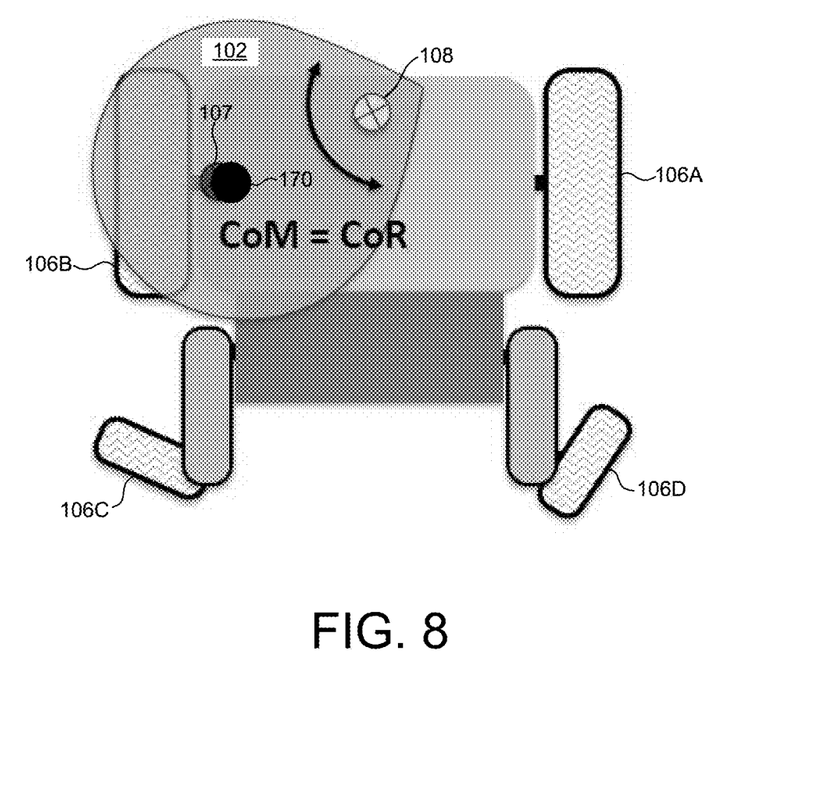
FIG. 8 depicts a service robot executing a rotation about a center of rotation that is approximately aligned with a center of mass of the service robot.

FIG. 8 depicts the service robot 100 executing a rotation about the center of rotation (CoR) 170. As depicted in FIG. 4, computing system 200 of service robot 100 controls the vehicle actuators 163 to execute the desired motion trajectory. In the embodiment depicted in FIG. 8, computing system 200 sends command signals to rotary actuator 108 that causes the rotary actuator 108 to rotate payload platform 102 in a direction toward the instantaneous center of rotation 170 such that the distance between the instantaneous center of rotation 170 and the location 107 of the center of mass of the service robot 100 is approximately zero.

In a further aspect, the service robot 100 includes at least one wheel that is movable in a direction normal to the ground surface. The position of the at least one wheel with respect to the vehicle is controlled in the direction normal to the ground surface to maintain a level orientation of the vehicle as it traverses uneven terrain.

As depicted in FIGS. 1 and 6, the wheeled, robotic vehicle 101 includes two driving wheels attached to the frame of the vehicle (wheels 106A and 106B) and two additional steerable, balancing wheels (wheels 106C and 106D) attached to balancing arms 171A and 171B, respectively, that are, in turn, attached to the frame 105 of the vehicle 101. The balancing arms allow the steering wheels to be moved in a direction normal to the ground surface to accommodate uneven terrain.

Figure 9:
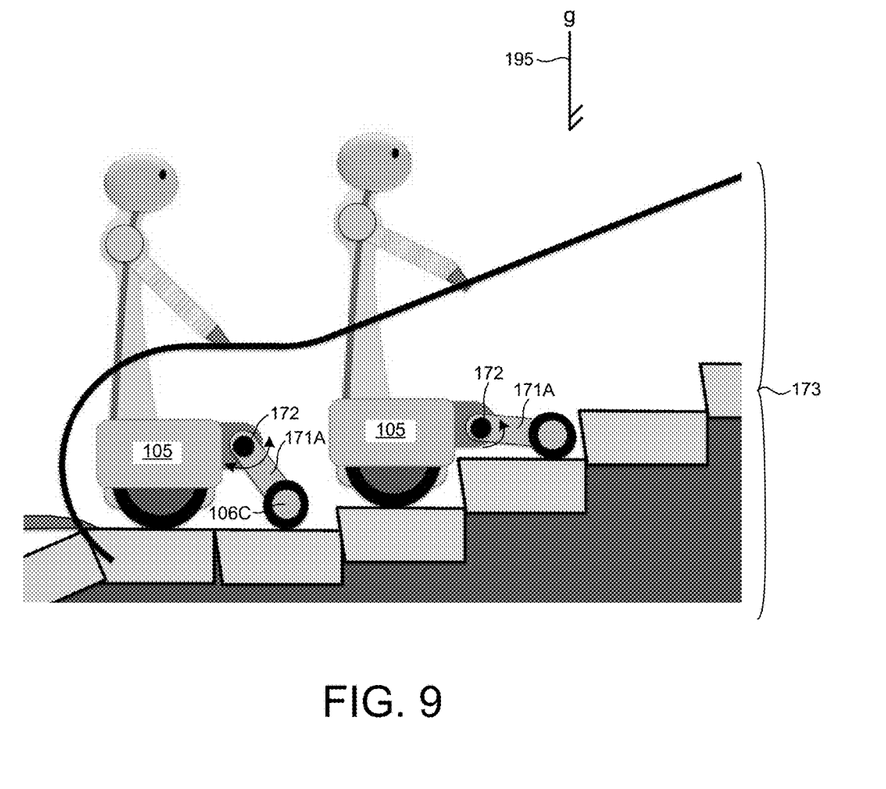
FIG. 9 depicts service robot 100 in an operational scenario that involves traveling up an escalator 173.

FIG. 9 depicts service robot 100 in an operational scenario that involves traveling up an escalator 173. In the embodiment depicted in FIG. 9, service robot 100 includes balance arm 171A coupled between the frame 105 of service robot 100 and wheel 106C of service robot 100. A rotary actuator 172 determines the rotational position of balance arm 171 with respect to frame 105, and hence the position of wheel 106C with respect to frame 105. As depicted in FIG. 9, the steps of escalator 173 are initially level. However, as the escalator moves the service robot forward and upward, the steps move vertically with respect to one another (i.e., in the direction opposite the gravity vector 195). Without control, this would cause service robot 100 to rotate counter-clockwise as viewed from FIG. 9. This may potentially destabilize service robot 100. However, computing system 200 receives signals from level sensors mounted to service robot 100. Level sensors (e.g., inertial sensors, etc.) detect the orientation of service robot 100 with respect to the gravitational field (depicted by gravity vector 195). As the vertical movement of the escalator steps cause service robot 100 to begin to tip backwards, this is detected by the level sensors. In response, computing system 200 communicates command signals to rotary actuator 172 that causes rotary actuator 172 to rotate balance arm 171 upward to level service robot 100. In this example, the rotation of balance arm 171 causes wheel 106C to move upward, opposite the direction of gravity vector 195. Similarly, balance arm 172B is coupled between the frame 105 of service robot 100 and wheel 106D of service robot 100. The control of balance arms 171A and 171B is coordinated to maintain level operation of service robot 100.

In another further aspect, service robot 100 includes an upper body robot including an inflatable torso structure that allows the upper body robot to bend in a controlled manner to interact with users and a payload loaded onto the payload platform. In some embodiments, the upper body robot includes one or more inflatable arms attached to the inflatable torso by one or more rotary actuators. In some embodiments, the arms are configured to secure a payload on the payload platform. In some embodiments, the torso and arms are configured to gesture toward a user.

Figure 10:
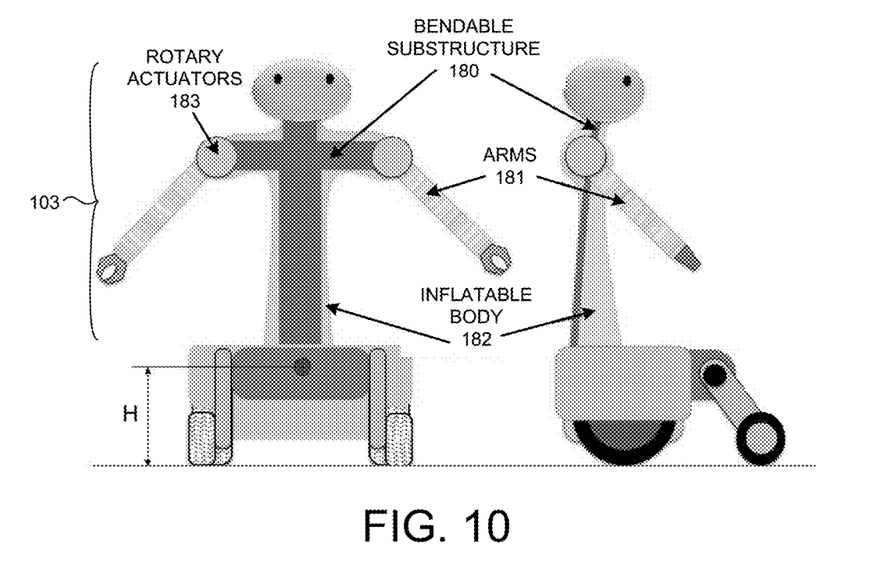
FIG. 10 is illustrative of a service robot including an upper body robot in one embodiment.

FIG. 10 is illustrative of service robot 100 including upper body robot 103 in one embodiment. As depicted in FIG. 10, upper body robot 103 includes an inflatable body structure 182 (i.e., torso structure) that controls the position of a bendable substructure 180 mounted within the inflatable body structure 182. Bendable substructure 180 is a slender structural element that is relatively stiff along its length, but is relatively flexible in bending. The inflation of inflatable body 182, in combination with the forces of gravity determines the position of bendable substructure 180.

Rotary actuators 183 are mounted to upper body robot 103 between the Bendable substructure 180 and arm structures 181. Rotary actuators 183 control the movement of arm structures 181 relative to the bendable substructure 180. In some embodiments, arm structures 181 are also inflatable and provide a soft interface between service robot 100 and people and objects interacting with the service robot 100.

Figure 11:
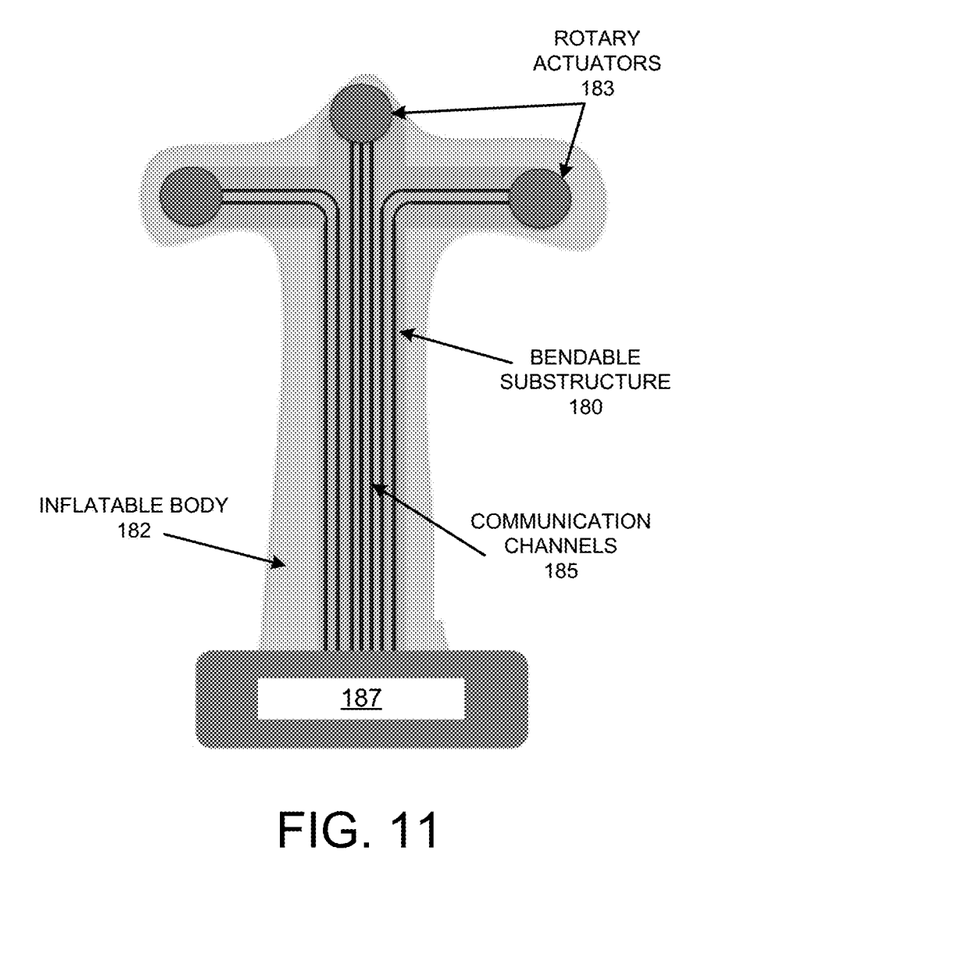
FIG. 11 is illustrative of a bendable substructure of an upper body robot.

As depicted in FIG. 11, bendable substructure 180 includes a flexible substrate such as a thin plate. Bendable substructure 180 also includes a number of physical communication channels 185 attached to the flexible substrate. For example, electrical wiring, pneumatic tubes, actuator cables, etc., may be mounted to the flexible substrate. The physical communication channels 185 are also flexible in bending and communicate power and signals from interface 187 to sensors and actuators mounted to upper body robot 103.

In some embodiments, interface 187 includes actuators mounted to wheeled, robotic vehicle 101. The actuators are coupled to joints of upper body robot 103 by cables that are mounted to a flexible substrate of bendable substructure 180. The position of each actuator is transmitted to each corresponding joint of the upper body robot 103 by the cables. In this manner, each actuator determines the position of each corresponding joint of the upper body robot 103.

In some embodiments, the joint between the inflatable body 182 and each arm structure 181 includes a two degree of freedom rotary actuation system (e.g., pan-tilt actuator system) that allows the arm structures 181 to move over a large workspace in two degrees of freedom. FIG. 9 depicts the workspace 188 of each arm structure in one degree of freedom and the workspace 189 of each arm structure in a second degree of freedom that is orthogonal to the first degree of freedom.

Computing system 200 is configured to communicate command signals to each of the actuators of the upper body robot 103. In this manner, computing system 200 controls the motion of upper body robot 103, including the position or torque at each joint and the inflation of each member of upper body robot 103.

Figure 12:
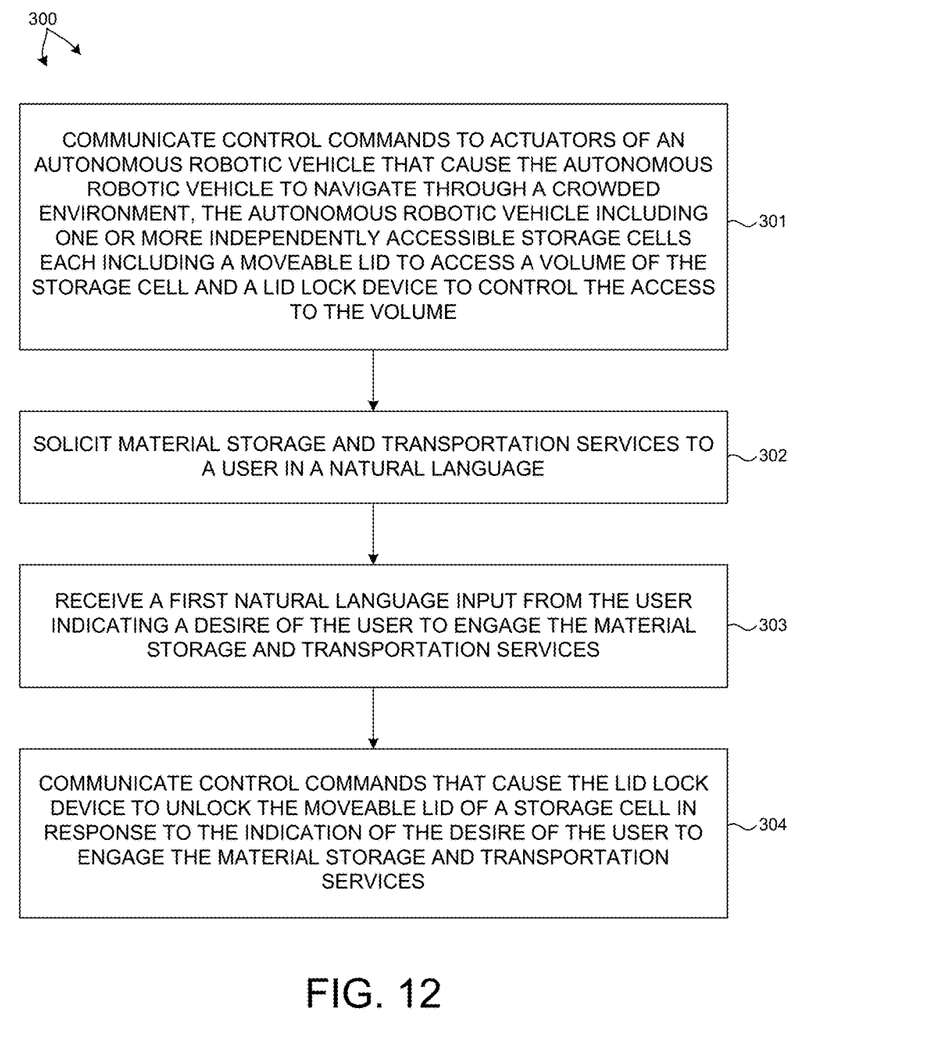
FIG. 12 illustrates a flowchart of a method 300 implementing material storage and transportation functionality as described herein.

FIG. 12 illustrates a flowchart of a method 300 suitable for implementation by a service robot as described herein. In some embodiments, service robot 100 is operable in accordance with method 300 illustrated in FIG. 12. However, in general, the execution of method 300 is not limited to the embodiments of service robot 100 described with reference to FIGS. 1-11. These illustrations and corresponding explanation are provided by way of example as many other embodiments and operational examples may be contemplated.

In block 301, control commands are communicated to actuators of an autonomous robotic vehicle that cause the autonomous robotic vehicle to navigate through a crowded environment. The autonomous robotic vehicle includes one or more independently accessible storage cells. Each storage cell includes a moveable lid to access a volume of the storage cell and a lid lock device to control the access to the volume.

In block 302, material storage and transportation services are solicited to a user in a natural language.

In block 303, a first natural language input is received from the user indicating a desire of the user to engage the material storage and transportation services.

In block 304, control commands are communicated to the lid lock device that cause the lid lock device to unlock the moveable lid of a storage cell in response to the indication of the desire of the user to engage the material storage and transportation services.

The computing system 200 may include, but is not limited to, a personal computer system, mainframe computer system, workstation, image computer, parallel processor, or any other computing device known in the art. In general, the term "computing system" may be broadly defined to encompass any device, or combination of devices, having one or more processors, which execute instructions from a memory medium. In general, computing system 200 may be integrated with an autonomous robotic vehicle, such as service robot 100, or alternatively, may be separate, entirely, or in part, from any autonomous robotic vehicle. In this sense, computing system 200 may be remotely located and receive data and transmit command signals to any element of service robot 100.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A service robot comprising:
    an autonomous robotic vehicle including a payload platform;
    a secured storage pod comprising one or more independently accessible storage cells mounted to the payload platform, wherein each of the independently accessible storage cells comprises:
        a moveable lid disposed over an opening of the independently accessible storage cell, wherein the moveable lid in a closed position prevents access to a volume of the storage cell, wherein the moveable lid in an open position permits access to the volume of the storage cell;
        a lid lock device configured to fix the moveable lid in the closed position in a locked state and release the moveable lid in an unlocked state;
    an audio/video output device configured to communicate information to a user of the service robot;
    an audio/video capture device configured to receive natural language input from the user of the service robot.

2. The service robot of claim 1, further comprising:
    a computing system configured to:
        communicate control commands to actuators of the autonomous robotic vehicle that cause the autonomous robotic vehicle to navigate through a crowded environment;
        communicate audio signals to the audio output device that cause the audio/video output device to audibly solicit material storage and transportation services to the user of the service robot;
        receive a first natural language input from the user indicating a desire of the user to engage the material storage and transportation services of the service robot; and
        communicate control commands that cause the lid lock device to unlock a moveable lid of a storage cell in response to the indication of the desire of the user to engage the material storage and transportation services.

3. The service robot of claim 2, wherein the computing system is further configured to:
    receive a second natural language input from the user indicating a desired period of time and location for the service robot to meet the user; and
    communicate control commands to actuators of the autonomous robotic vehicle that cause the autonomous robotic vehicle to navigate to the desired location at the desired time.

4. The service robot of claim 3, wherein the computing system is further configured to:
    receive an access code from the user indicating a desire of the user to unlock the moveable lid of the storage cell; and
    communicate control commands that cause the lid lock device to unlock the moveable lid of the storage cell in response to the access code.

5. The service robot of claim 3, wherein the desired location is a parcel delivery service terminal.

6. The service robot of claim 3, wherein the desired location is within a predetermined distance from the user for the desired period of time.

7. The service robot of claim 1, further comprising:
    an electronic pay device configured to exchange payment information with a portable electronic device operated by the user of the service robot.

8. The service robot of claim 7, wherein the payment information is communicated between the portable electronic device and the electronic payment device in accordance with a near field communication protocol.

9. The service robot of claim 1, wherein each of the one or more independently accessible storage cells further comprises:
    a storage cell lock device configured to fix the independently accessible storage cell to the payload platform in a locked state and release the independently accessible storage cell from the payload platform in an unlocked state.

10. The service robot of claim 1, wherein the autonomous robotic vehicle includes a frame, one or more wheels attached to the frame, and a payload platform actuator attached to the frame and the payload platform, the payload platform actuator configured to move the payload platform relative to the frame, wherein the computing system is further configured to:
    communicate one or more control commands to the autonomous robotic vehicle that causes the wheels to move over a ground surface along a motion trajectory; and
    communicate one or more control commands to the payload platform actuator that cause the payload platform actuator to move a center of mass of the payload toward a center of rotation of the autonomous robotic vehicle at a point along the motion trajectory.

11. The service robot of claim 10, further comprising:
    one or more payload sensors configured to measure a mass of the payload and a location of the center of mass of the payload.

12. An autonomous robotic vehicle comprising:
    a secured storage pod comprising one or more independently accessible storage cells, wherein each of the independently accessible storage cells comprises:
        a moveable lid disposed over an opening of the independently accessible storage cell, wherein the moveable lid in a closed position prevents access to a volume of the storage cell, wherein the moveable lid in an open position permits access to the volume of the storage cell;
        a lid lock device configured to fix the moveable lid in the closed position in a locked state and release the moveable lid in an unlocked state; and
    a natural language interface configured to communicate information between a user and a computing system of the autonomous robotic vehicle, wherein the computing system is configured to:
        communicate control commands to actuators of the autonomous robotic vehicle that cause the autonomous robotic vehicle to navigate through a crowded environment;
        communicate information via the natural language interface to solicit material storage and transportation services to the user;
        receive a first natural language input from the user indicating a desire of the user to engage the material storage and transportation services; and
        communicate control commands that cause the lid lock device to unlock a moveable lid of a storage cell in response to the indication of the desire of the user to engage the material storage and transportation services.

13. The autonomous robotic vehicle of claim 12, wherein the computing system is further configured to:
  receive a second natural language input from the user indicating a desired period of time and location for the service robot to meet the user; and
  communicate control commands to actuators of the autonomous robotic vehicle that cause the autonomous robotic vehicle to navigate to the desired location at the desired time.

14. The autonomous robotic vehicle of claim 13, wherein the computing system is further configured to:
  receive an access code from the user indicating a desire of the user to unlock the moveable lid of the storage cell; and
  communicate control commands that cause the lid lock device to unlock the moveable lid of the storage cell in response to the access code.

15. The autonomous robotic vehicle of claim 13, wherein the desired location is a parcel delivery service terminal.

16. The autonomous robotic vehicle of claim 13, wherein the desired location is within a predetermined distance from the user for the desired period of time.

17. A method comprising:
  communicating control commands to actuators of an autonomous robotic vehicle that cause the autonomous robotic vehicle to navigate through a crowded environment, the autonomous robotic vehicle including one or more independently accessible storage cells each including a moveable lid to access a volume of the storage cell and a lid lock device to control the access to the volume;
  soliciting material storage and transportation services to a user in a natural language;
  receiving a first natural language input from the user indicating a desire of the user to engage the material storage and transportation services; and
  communicating control commands that cause the lid lock device to unlock the moveable lid of a storage cell in response to the indication of the desire of the user to engage the material storage and transportation services.

18. The method of claim 17, further comprising:
  receiving a second natural language input from the user indicating a desired period of time and location for the service robot to meet the user; and
  communicating control commands to actuators of the autonomous robotic vehicle that cause the autonomous robotic vehicle to navigate to the desired location at the desired time.

19. The method of claim 17, further comprising:
  receiving an access code from the user indicating a desire of the user to unlock the moveable lid of the storage cell; and
  communicating control commands that cause the lid lock device to unlock the moveable lid of the storage cell in response to the access code.

20. The method of claim 17, further comprising:
  receiving payment information from a portable electronic device operated by the user; and
  communicating the access code to the user in response to the received payment information.

* * * * *

UNITED STATES PATENT AND TRADEMARK OFFICE
CERTIFICATE OF CORRECTION

PATENT NO. : 10,286,558 B1
APPLICATION NO. : 15/491886
DATED : May 14, 2019
INVENTOR(S) : Haruhiko Harry Asada and Kumiko Asada Page 1 of 1

It is certified that error appears in the above-identified patent and that said Letters Patent is hereby corrected as shown below:

On the Title Page

The list of Assignee(s) reading:
"Boston Incubator Center, LLC, Lexington, MA (US)"

Should read:
--Boston Incubator Center, LLC, Lexington, MA (US); East Japan Railway Company, Saitama (JP)--

Signed and Sealed this
Second Day of July, 2019

Andrei Iancu
*Director of the United States Patent and Trademark Office*